US008938270B2

(12) United States Patent
Singh

(10) Patent No.: US 8,938,270 B2
(45) Date of Patent: *Jan. 20, 2015

(54) METHOD AND SYSTEM ENABLING USE OF WHITE SPACE RADIO SPECTRUM USING AN OUT OF BAND CONTROL CHANNEL

(75) Inventor: Rajendra Singh, Indian Creek Village, FL (US)

(73) Assignee: Telcom Ventures, LLC, Miami, FL (US)

( * ) Notice: Subject to any disclaimer, the term of this patent is extended or adjusted under 35 U.S.C. 154(b) by 472 days.

This patent is subject to a terminal disclaimer.

(21) Appl. No.: 13/364,821

(22) Filed: Feb. 2, 2012

(65) Prior Publication Data

US 2012/0135767 A1 May 31, 2012

Related U.S. Application Data

(63) Continuation of application No. 12/196,609, filed on Aug. 22, 2008, now Pat. No. 8,130,708.

(51) Int. Cl.
*H04W 72/04* (2009.01)
*H04W 16/14* (2009.01)

(52) U.S. Cl.
CPC ..................... *H04W 16/14* (2013.01)
USPC ............. 455/509; 455/69; 370/329; 370/338; 370/208; 370/252; 370/328

(58) Field of Classification Search
CPC . H04W 16/14; H04W 52/243; H04W 52/283; H04W 52/367; H04W 60/00
See application file for complete search history.

(56) References Cited

U.S. PATENT DOCUMENTS

| 5,696,903 | A | 12/1997 | Mahany |
| 5,734,963 | A | 3/1998 | Fitzgerald |
| 5,809,423 | A | 9/1998 | Benveniste |
| 5,898,923 | A | 4/1999 | Gaasvik |
| 6,181,918 | B1 | 1/2001 | Benveniste |

(Continued)

FOREIGN PATENT DOCUMENTS

WO WO-2006120447 11/2006

OTHER PUBLICATIONS

Patent Cooperation Treaty, PCT/US2009/046982 International Search Report mailed Jul. 30, 2009.

(Continued)

*Primary Examiner* — Yuwen Pan
*Assistant Examiner* — Fanghwa Wang
(74) *Attorney, Agent, or Firm* — DLA Piper LLP (US)

(57) ABSTRACT

A system (10) and method (50) of dynamic allocation of spectrum for a communication device involves receiving (51) a user channel map (UCM) on a control channel that is outside the band of interest. The UCM can include at least boundary location information for one or more channel resources. The method can determine (52) at least an approximate location for the communication device, compare (56) the approximate location with the boundary location information, and determine (57) which channels can avoid co-channel and adjacent channel interference with licensed users and other unlicensed users based on the comparison. The method can relax communication parameters for the one or more channel resources if no licensed user signals are found in the user channel map, and tightening the communication parameters if co-channel, adjacent channel, or other interference generating channel use is found within the user channel map.

20 Claims, 4 Drawing Sheets

(56) References Cited

U.S. PATENT DOCUMENTS

| | | |
|---|---|---|
| 6,505,049 B1 | 1/2003 | Dorenbosch |
| 6,522,888 B1 | 2/2003 | Garceran |
| 6,639,904 B1 | 10/2003 | Boyer |
| 6,735,630 B1 | 5/2004 | Gelvin |
| 6,826,607 B1 | 11/2004 | Gelvin |
| 7,027,462 B2 | 4/2006 | Benveniste |
| 7,069,577 B2 | 6/2006 | Geile |
| 7,085,637 B2 | 8/2006 | Breed |
| 7,095,754 B2 | 8/2006 | Benveniste |
| 7,110,880 B2 | 9/2006 | Breed |
| 7,202,776 B2 | 4/2007 | Breed |
| 7,274,708 B2 | 9/2007 | Benveniste |
| 7,289,972 B2 | 10/2007 | Rieser |
| 2004/0028003 A1 | 2/2004 | Diener |
| 2004/0047324 A1 | 3/2004 | Diener |
| 2005/0070281 A1 | 3/2005 | Rajkotia |
| 2006/0067354 A1 | 3/2006 | Waltho |
| 2006/0083205 A1 | 4/2006 | Buddhikot |
| 2006/0084444 A1 | 4/2006 | Kossi |
| 2006/0128393 A1 | 6/2006 | Rooyen |
| 2006/0167784 A1 | 7/2006 | Hoffberg |
| 2006/0258362 A1 | 11/2006 | Jin et al. |
| 2007/0133387 A1 | 6/2007 | Arslan |
| 2007/0155489 A1 | 7/2007 | Beckley |
| 2007/0230541 A1 | 10/2007 | Haartsen |
| 2007/0232358 A1 | 10/2007 | Sherman |
| 2007/0243877 A1 | 10/2007 | Elmaleh |
| 2007/0249341 A1 | 10/2007 | Chu |
| 2008/0089279 A1 | 4/2008 | Hu |
| 2008/0102956 A1 | 5/2008 | Burman |
| 2008/0102957 A1 | 5/2008 | Burman |
| 2008/0117871 A1 | 5/2008 | Olexa |
| 2008/0154826 A1 | 6/2008 | Backof |
| 2008/0155249 A1 | 6/2008 | Backof |
| 2008/0159207 A1 | 7/2008 | Levine |
| 2008/0178226 A1 | 7/2008 | Lee |
| 2009/0046625 A1 | 2/2009 | Diener et al. |
| 2009/0298522 A1 | 12/2009 | Chaudhri |

OTHER PUBLICATIONS

International Search Report and Written Opinion issued in PCT/US09/046983 dated Jul. 30, 2009.
U.S. Appl. No. 12/196,644.
U.S. Appl. No. 13/438,429.
U.S. Appl. No. 12/196,609.

45

METHOD AND SYSTEM ENABLING USE OF WHITE SPACE RADIO SPECTRUM USING AN OUT OF BAND CONTROL CHANNEL

CROSS-REFERENCE TO RELATED APPLICATIONS

This application is a continuation of U.S. patent application Ser. No. 12/196,609 filed Aug. 22, 2008, the contents of which is hereby incorporated by reference into this application as if set forth herein in full.

FIELD

This invention relates generally to efficient use of available spectrum, and more particularly to system and method of allocating spectrum where both licensed and unlicensed or secondary licensed users share spectrum.

BACKGROUND

There has been a considerable amount of interest in dynamic allocations of radio spectrum. In traditional licensed models for radio spectrum, the task of how radio spectrum is left up to the network operator. Generally, radio spectrum is allocated (in time/space) in a semi-static basis and periodically re-allocated based on demand and network evolution. However in a case where spectrum is not controlled by a network operator (or even licensed to any party), spectrum users will have to determine how and when they can use radio spectrum without causing interference to other licensed users which are using co-channel or adjacent channels, as well as other users which are unlicensed. In the current embodiments, both cases are addressed.

The primary objective in most communication systems is to avoid harmful interference to other licensed users which are on co-channel or adjacent channels in the same geographic area. These users have existing services which need to be protected in all cases. In cases where co channel or adjacent channel usage does not occur within a geographic region, the spectrum can be considered unused and can be made available to other users. One such example is the use of white spaces in television broadcast in the UHF band. "White spaces" are defined herein as the geographical areas where certain channels within the UHF band are not used for television broadcasting or other licensed purposes and "white space reception" is the reception of signals not used for broadcasting or other licensed purposes on the white spaces. There is great interest in using white spaces or under utilized and available spectrum. This is of great interest because many of the UHF band channels are not necessarily used for television reception in many areas. The UHF band is mostly used on a static basis. However, there has been interest by the broadcast industry in mobile reception of the broadcast signals. One needs to protect the fixed and mobile use of UHF band by licensed operators. There are several methods of protecting unlicensed users from each other. However, existing methods are not very efficient.

SUMMARY

Embodiments in accordance with the present invention can provide a method and system of using an out of band control channels to coordinate the interference free use of spectrum by multiple entities, including white spaces radio spectrum. In this embodiments herein, several techniques are described that can increase the spectral efficiency for unlicensed users.

In a first embodiment of the present invention, a method of dynamic allocation of spectrum for a communication device where a band of radio frequencies is used with a local, regional, or national frequency allocation that leads to a subset of the bands containing unused or available frequencies in any geographic area, but not all channels are used in all markets due to the need to protect receivers from interference from other stations involves receiving an user channel map on a control channel that is outside the band of interest. The user channel map can include at least boundary location information for one or more channel resources within a UHF band and communication parameters. The method further determines at least an approximate location for the communication device, compares the approximate location with the boundary location information, and determines which channels can avoid co-channel and adjacent channel interference with licensed users and other unlicensed users based on the comparison, boundary location information, and the communication parameters. The user channel map can further include communication parameters comprising maximum allowable transmit power, duty cycle, and in use information by other unlicensed and licensed users. The boundary location information can include polygon endpoint calculations and associated technical communication parameters. Also note, the band of radio frequencies used with local, regional, or national frequency allocation can be licensed television broadcasting frequencies. Further, the control channel can be a 900 MHz LMS band channel and optionally the control channel uses a portion of the 900 MHz LMS band channel for multilateration for location determination by the communication device.

The method can further include the steps of relaxing the communication parameters if no licensed users are found in the user channel map, tightening the communication parameters if co-channel, adjacent channel, or other interference generating channel use is found within the user channel map, and prohibiting use if a licensed operator is found within the user channel map. The method can further include the step of periodically updating and receiving a new user channel map. The method can also maintain a real-time status of licensed users for the user channel map. In other aspects, the method can determine the approximate location for the communication device by using a global positioning system device. The method can determine the approximate location for the communication device by using time distance of arrival or time of arrival, or other position location techniques by using a control channel signal or other signals from devices in a user channel map network. The method can transmit registration request and location information on a reverse channel for the control channel from the communication device. The communication device can receive an updated user channel map in response to the registration request. The method can further determine how to avoid interference by determining a probability that a given user device will cause interference to a licensed user by multiplying (P1) the probability that a given location does not have coverage on white space channel "N" times (P2) the probability that a given user device is in the proximity of a licensed receiver to cause interference.

In a second embodiment of the present invention, a system of dynamic allocation of spectrum for a communication device can include a receiver for receiving an user channel map on a control channel that is outside the band of interest, where the user channel maps contains at least boundary location information for one or more channel resources within a UHF band and communication parameters and a processor coupled to the receiver. The processor can be operable to determine at least an approximate location for the communication device, compare the approximate location with the boundary location information, and determine which channels can avoid co-channel and adjacent channel interference with licensed users and other unlicensed users based on the comparison, boundary location information, and the communication parameters. As noted above, the channel map can include communication parameters comprising maximum allowable transmit power, duty cycle, and in use information by other unlicensed and licensed users. The boundary location information can include polygon endpoint calculations and associated technical communication parameters. The processor can be further programmed to relax the communication parameters if no licensed users are found in the user channel map, tighten the communication parameters if co-channel, adjacent channel, or other interference generating channel use is found within the user channel map, and prohibit use if a licensed operator is found within the user channel map. The processor can also be further programmed to determine the approximate location for the communication device by using time distance of arrival or time of arrival, or other position location techniques by using a control channel signal or other signals from devices in a user channel map network. The processor can also determine how to avoid interference by determining a probability that a given user device will cause interference to a licensed user by multiplying (P1) the probability that a given location does not have coverage on white space channel "N" times (P2) the probability that a given user device is in the proximity of a licensed receiver to cause interference.

In accordance with various embodiments of the present disclosure, the methods described herein can be embodied for operation as software programs running on a computer processor. Furthermore, software implementations can include, but not limited to, distributed processing or component/object distributed processing, parallel processing, or virtual machine processing can also be constructed to implement the methods described herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," "resizing program" and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
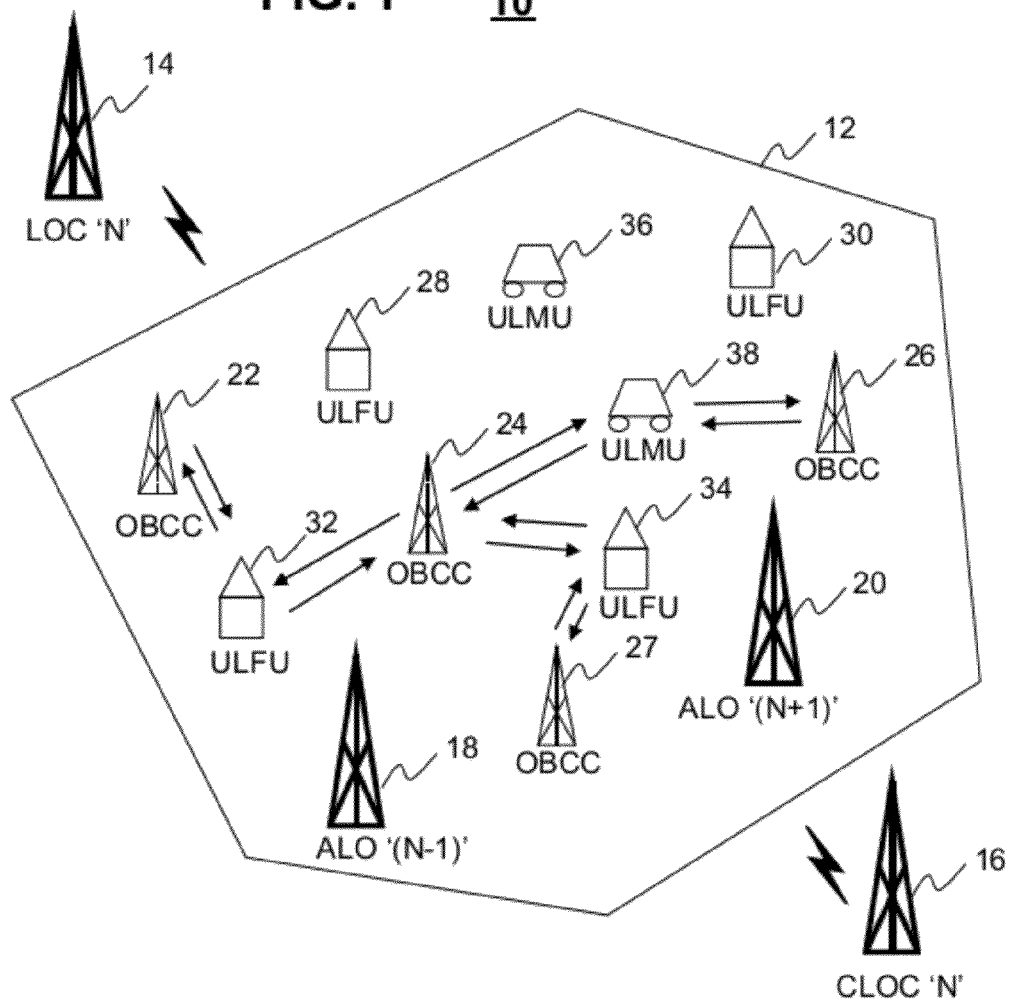
FIG. 1 is an illustration of a communication system using white spaces in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of ways using a variety of technologies that enable various techniques and systems enabling the efficient use of white space radio spectrum using an out of band control channel. There are several autonomous, semiautonomous, and registration based techniques which can be used to enable the use of white spaces.

In an Autonomous mode (AM), a user device (fix or mobile) receives a user channel map (UCM) on a control channel. UCM data contains information regarding polygon endpoint boundary coordinates for channel "N" as illustrated in FIG. 1 and can have information for other channels under consideration in a given band. Generally, information regarding channels and multiple bands can be transmitted on a single control channel or a set of control channels. The UCM can also contain information on other technical parameters such as maximum allowable transmit power, duty cycle, and in-use information by other unlicensed users.

Referring once again to FIG. 1, a communication system 10 can include a polygon boundary 12 for a channel 'N'. Outside the boundary 12 can be a license operator on the white space channel 'N' designated as LOC 'N' 14 as well as a co-channel licensed operator on white space channel 'N' designated as CLOC 'N' 16. Within the polygon boundary 12 can be any number of network elements including adjacent channel licensed operators on white spaces channel (N−1) and (N+1) designated respectively as ALO '(N−1)' 18 and ALO '(N+1)' 20. Within the polygon boundary 12, there can also be a number of out of band control channels designated as OBCC 22, 24, 26 and 27, a number of unlicensed fixed users designated as ULFU 28, 30, 32, and 34, and a number of unlicensed mobile users designated as ULMU 36 and 38.

In autonomous mode, it is assumed that user has information regarding its location independent of the UCM or multilateration provided by the UCM network. Note, multilateration, also known as hyperbolic positioning, is the process of locating an object by accurately computing the time difference of arrival (TDOA) of a signal emitted from the object to three or more receivers. It also refers to the case of locating a receiver by measuring the TDOA of a signal transmitted from three or more synchronized transmitters. Based on the boundary comparison, a user device (fixed and/or mobile) can calculate which channels in the band under consideration can be used and determine the associated technical parameters. For example, a device may get its location information from GPS or assisted GPS. It may get the UCM for the UHF band from the UCM network. The user device can calculate which UHF channels it is allowed to use at that given location and associated technical parameters. If there is no licensed use (co-channel or adjacent channel) at that location as calculated by the UCM network, associated technical parameters for channel "N" in FIG. 1 can be relaxed. If there is a use by adjacent channels, then technical parameters need to be changed accordingly to avoid causing interference with the licensed adjacent channels. If there is co-channel use at that location by a licensed operator, then use by unlicensed user devices (fixed and/or mobile) should be prohibited. In a separate section further below, the polygon endpoint calculations and associated technical parameters will be further described. Further note that in the autonomous mode, user devices (fixed and/or mobile) should periodically update the UCM information. This information may be updated more frequently for a mobile user device than for a fixed user device.

In a Semi-Autonomous Mode (SAM), like the autonomous mode, a user device in this mode can receive UCM from the control channel but can also calculate location information based on a control channel signal or other signals transmitted by the UCM network. A User device may use exclusively UCM network transmission signals to calculate its location or use these signals to compliment its own location information. For example, a user device may use location information from a GPS device while in open rural areas, but can use control channel and/or UCM network transmitter signals in heavily built urban areas where GPS may not work. A separate section will discuss an example using the 900 MHz LMS network allowing such a technique by a user device. In this mode also, a user device will periodically update the UCM.

In a Non-Autonomous Mode (NAM), a user device will depend on the UCM network for the calculation of location information, the UCM and associated technical parameters. The user device may be fixed and/or mobile. In the case of a fixed device, a UCM network may provide the UCM and associated technical parameters on a wired network. In all cases, UCM information will be updated on a periodic basis.

In the NAM mode, a user device will transmit a registration request on the reverse UCM control channel. This can be an in-band and/or an out-of-band reverse control channel. The UCM network will calculate the location of the user device and transmit the location information and UCM to the user. In this case, the UCM network may also perform the calculation regarding which channels can be used by the user device and associated technical parameters. The UCM network in this case has should account for the other unlicensed users which may be requesting the registration for the use of the same radio spectrum band. The UCM network will also inform the user device when the UCM needs to be updated.

In a Hybrid Mode, the user device has its location information. The User device will request the registration from the UCM network. The UCM network will send the UCM and associated technical information on a forward control channel. A Reverse control channel may or may not be in band. Registration is enabled by the UCM network but location is calculated by the user device in this mode. Location calculation can be done by user device in this mode. Location calculation can be done by the user device in an autonomous or semi-autonomous mode.

The calculation of polygon endpoints is critical in many instances. More particularly, in the methods where UCM information is transmitted to the end user devices, geographical areas where licensed spectrum can be used is very critical. If the standard for such use is relaxed it has the potential to cause harmful interference to the licensed user. On the other hand, if such criteria are too restrictive, it will be detrimental to the spectral efficiency and decrease the available spectrum for all users. Therefore, a careful balance needs to be maintained. In the careful selection of technical parameters such as maximum transmit power, power control, duty cycle, an outbound band emission can assist to reduce the probability of harmful interference. The UCM network also should maintain a real-time status of the licensed use.

This problem is greatly simplified in the frequency bands which are used for one-way transmit networks such as UHF television broadcast networks. In this case, the television broadcast network transmits in one location. Most television receivers tend to be in fixed locations however, there may be an increased use of mobile television receiver devices in this band. The UCM network should protect both fixed and mobile devices from potential harmful interference.

For a harmful interference to occur there needs to be two conditions. One, there needs to be a usable radio signal from the licensed operator. This can be calculated and confirmed by real-world measurements if desired. Based on the radio signal propagation, calculation one can compute the percentage time and location, a radio signal is available. For example, for a television broadcast signal the percent of time a signal is available needs to be very high. Secondly, the user device depending on its transmit power and out of band emission, needs to be a certain distance from the receiver (licensed band receiver) to cause harmful interference.

The probability of such interference can also be calculated base on the technical parameters.

$P1$=Probability that a given location does not have coverage on white space channel 'N'

$P2$=Probability that a given user device is in close enough proximity of a receiver tuned to the licensed frequency to cause interference.

$P3$=Probability that a given user device will cause interference to a licensed user.

Assuming that the two events are independent, then $$P3=P1*P2$$

Figure 2:
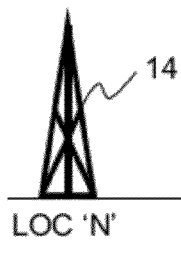
FIG. 2 is an illustration of communication system using white spaces and multiple polygons in accordance with an embodiment of the present invention.

The UCM method provides significant control to reduce the potential for harmful interference by controlling the $P1$ and $P2$ by the use of polygon endpoint calculation for a given channel. In a non-autonomous mode, a UCM network will have more effective control in managing $P3$, especially when adjacent channel interference is calculated. To allow a more efficient use of spectrum, the UCM may have multiple overlapping polygons for a given channel and the user device may select the best one for a given location. In FIG. 2, unlicensed mobile user 3 can transmit at a much higher power level on channel N, as compared to ULMU2 and ULMU1 while still maintaining $P3$ below a desired level. The same method can be applied to the adjacent channel. A user of a device who is willing to maintain a lower out of band emission may transmit at a higher power than a device with a less restrictive out of band emission while still maintaining $P3$ below the desired level.

The UCM network can refine these parameters with actual field co-channel and adjacent channel measurements apriori or ahead of time. This will allow the UCM network to create more fine-tuned multiple polygons. The method of receiving and updating UCM does not need to change.

Figure 3:
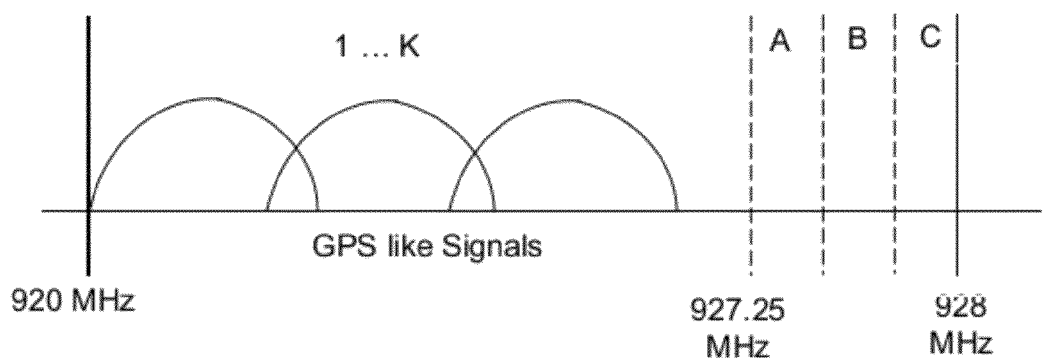
FIG. 3 is an illustration of frequency utilization using the 900 MHz LMS band in accordance with an embodiment of the present invention.

The 900 MHz LMS band has very good propagation characteristics and can be utilized effectively with the UCM network. The LMS band is licensed for position location using multilateration and a forward channel as shown in FIG. 3. In one network configuration, the system can use three higher power channels A, B, and C (up to 300 watts) for the control channel UCM and use the 920-927.25 band for the multilateration. In one example, one can transmit GPS like signals in the 920-927.5 band and GSM like signals on channels A, B, and C. User devices will receive standard GPS signals and also GPS like signals in the 920-927.5 band. These signals will be transmitted from OBCC transmitters (see FIG. 1) and user devices can use them for multilateration with or without GPS. This method will be very effective in urban or built-up areas. For registration, a user can use return links in the 902-920 MHz unlicensed band or some other band.

Figure 4:
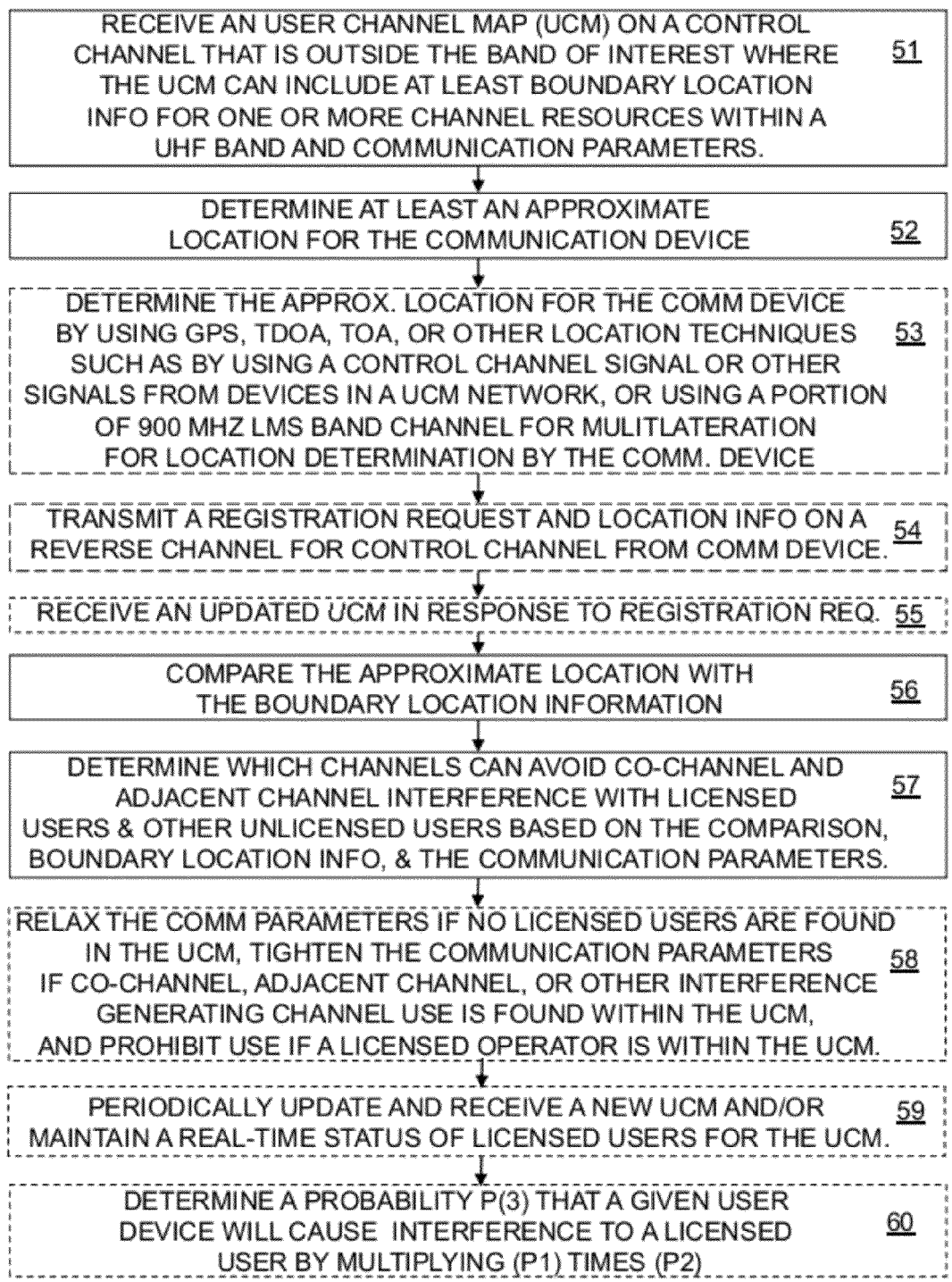
FIG. 4 is flow chart illustrating a method of allocating white spaces in accordance with an embodiment of the present invention.

Referring to FIG. 4, a flow chart for a method 50 of dynamic allocation of spectrum for a communication device is shown. The spectrum can involve a band of radio frequencies used with a local, regional, or national frequency allocation that leads to a subset of the bands containing unused or available frequencies in any geographic area (such as television broadcast signals), but not all channels are used in all markets due to the need to protect receivers from interference from other stations. The method 50 can involve receiving a user channel map on a control channel that is outside the band of interest at 51. The user channel map can include at least boundary location information for one or more channel resources within a UHF band and communication parameters. The method can further determine at 52 at least an approximate location for the communication device. The approximate location for the communication device can optionally or alternatively be determined at 53 by using a global positioning system device or by using time distance of arrival or time of arrival, or other position location techniques by using a control channel signal or other signals from devices in a user channel map network. At 54, the method can transmit registration request and location information on a reverse channel for the control channel from the communication device. At 55, the communication device can also optionally receive an updated user channel map in response to the registration request. At 56, the method can compare the approximate location with the boundary location information, and at 57 determine which channels can avoid co-channel and adjacent channel interference with licensed users (i.e., users receiving, for example, television broadcast signals on licensed frequencies) and other unlicensed users (e.g., a user receiving a white space reception) based on the comparison, boundary location information, and the communication parameters. The user channel map can further include communication parameters comprising maximum allowable transmit power, duty cycle, and in use information by other unlicensed and licensed users. The boundary location information can include polygon endpoint calculations and associated technical communication parameters. Also note, the band of radio frequencies used with local, regional, or national frequency allocation can be licensed television broadcasting frequencies. Further, the control channel can be a 900 MHz LMS band channel and optionally the control channel uses a portion of the 900 MHz LMS band channel for mulitlateration for location determination by the communication device.

The method at 58 can further include relaxing the communication parameters if no licensed users are found in the user channel map, tightening the communication parameters if co-channel, adjacent channel, or other interference generating channel use is found within the user channel map, and prohibiting use if a licensed operator is found within the user channel map. In one embodiment, the user device can relax or tighten the comparison with the polygon boundary information based on the accuracy of position location of the user device. For example if the accuracy of the user device is ±50 meters, the user device can provide a buffer of 50 meters whereas if the location accuracy is ±1000 meters, then a geographical buffer needs to be much larger. Location accuracy can be predetermined based on the positioning technology use or can alternatively be transmitted in the UCM if determined by the system. The method at 59 can also periodically update and receive a new user channel map. The method can also maintain a real-time status of licensed users for the user channel map. The method 50 can further determine how to avoid interference at 60 by determining a probability that a given user device will cause interference to a licensed user by multiplying (P1) the probability that a given location does not have coverage on white space channel "N" times (P2) the probability that a given user device is in the proximity of a licensed receiver to cause interference.

Figure 5:
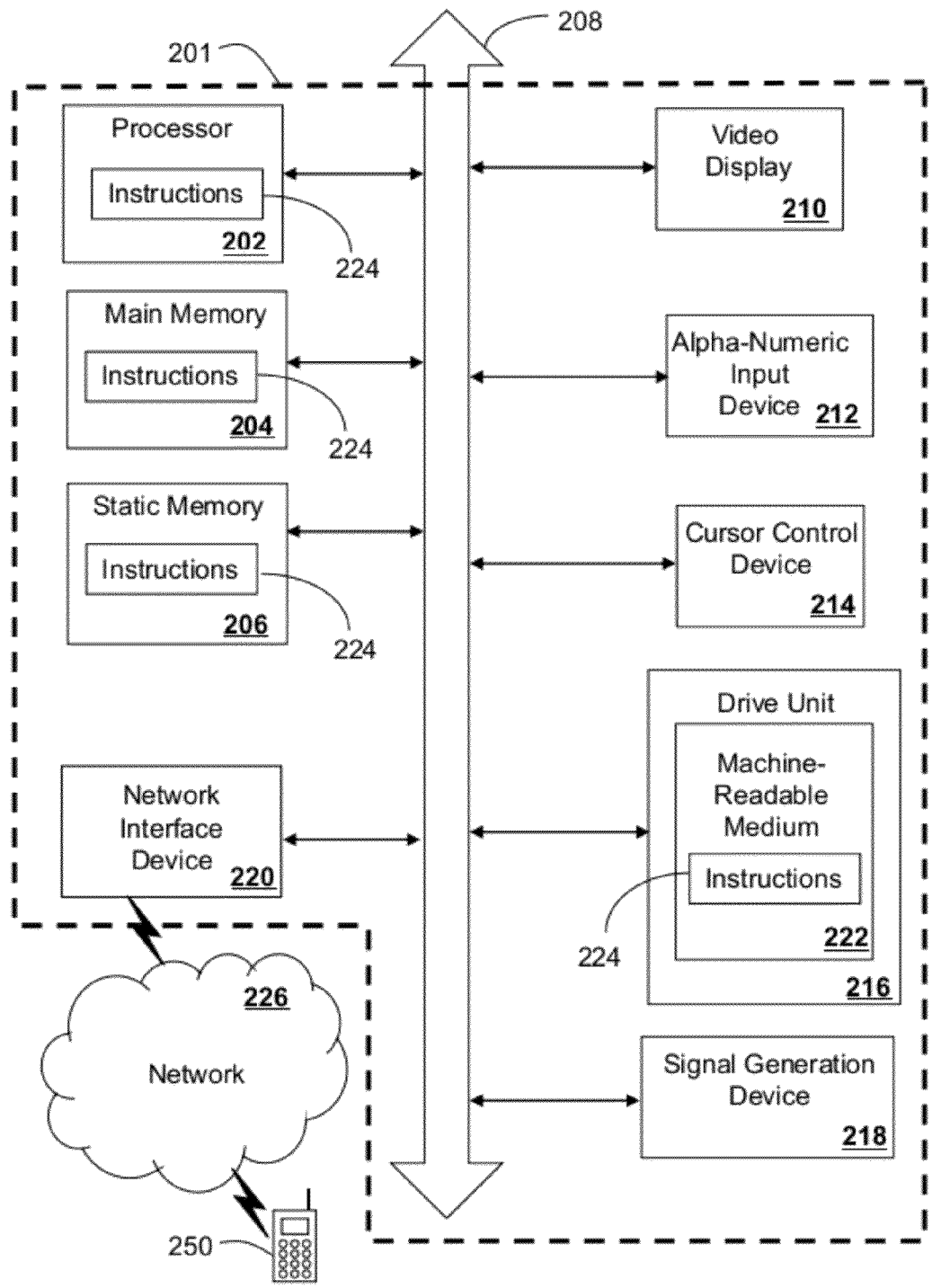
FIG. 5 is a block diagram of an electronic device in accordance with an embodiment of the present invention.

In another embodiment of the present invention as illustrated in the diagrammatic representation of FIG. 5, an electronic product such as a machine having a display 210 can include a processor or controller 202 coupled to the display. Generally, in various embodiments it can be thought of as a machine in the form of a computer system 200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such the display 210. The computer system 200 may include an input device 212 (e.g., a keyboard, microphone, etc.), a cursor control device 214 (e.g., a mouse), a disk drive unit 216, a signal generation device 218 (e.g., a speaker or remote control that can also serve as a presentation device) and a network interface device 220. Of course, in the embodiments disclosed, many of these items are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor or controller 202 during execution thereof by the computer system 200. The main memory 204 and the processor or controller 202 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of dynamic allocation of spectrum for a communication device where a band of radio frequencies is used with a local, regional, or national frequency allocation that leads to a subset of the bands containing unused or available frequencies in any geographic area, but not all channels are used in all markets due to the need to protect receivers from interference from other stations, comprising the steps of:
   receiving an user channel map on a control channel containing at least boundary location information for one or more channel resources, the control channel being outside the one or more channel resources;
   determining at least an approximate location for the communication device;
   comparing the approximate location with the boundary location information;
   determining which channels can avoid co-channel and adjacent channel interference with licensed user signal and other unlicensed user signals based on the comparison; and
   relaxing communication parameters for the one or more channel resources if no licensed user signals are found in the user channel map, and tightening the communication parameters if co-channel, adjacent channel, or other interference generating channel use is found within the user channel map.

2. The method of claim 1, wherein the user channel map further comprises communication parameters comprising maximum allowable transmit power, duty cycle, and in use information by other unlicensed and licensed users.

3. The method of claim 1, wherein the one or more channel resources are within a UHF band.

4. The method of claim 1, wherein the boundary location information comprises polygon endpoint calculations and associated technical communication parameters.

5. The method of claim 1, wherein the method further comprises the step of periodically updating and receiving a new user channel map.

6. The method of claim 1, wherein the method determines the approximate location for the communication device by using a global positioning system device.

7. The method of claim 1, wherein the method determines the approximate location for the communication device by using time distance of arrival or time of arrival, or other position location techniques by using a control channel signal or other signals from devices in a user channel map network.

8. The method of claim 1, wherein the method further comprises the step of transmitting a registration request and location information on a reverse channel for the control channel from the communication device.

9. The method of claim 8, wherein the communication device receives an updated user channel map in response to the registration request.

10. The method of claim 1, wherein the method further comprises the step of maintaining a real-time status of licensed users for the user channel map and wherein the method prohibits the use if a licensed operator signal is found within the user channel map.

11. The method of claim 1, wherein the method further comprises the step of modifying a buffer tolerance used for comparison with the boundary location information based on a level of location accuracy of the communication device.

12. The method of claim 1, wherein the control channel uses a portion of a 900 MHz Location and Monitoring Service (LMS) band channel for mulitlateration for location determination by the communication device.

13. The method of claim 1, wherein the method determines how to avoid interference by determining a probability that a given user device will cause interference to a licensed user by multiplying (P1) the probability that a given location does not have coverage on white space channel "N" times (P2) the probability that a given user device is in the proximity of a licensed receiver to cause interference.

14. The method of claim 1, wherein the band of radio frequencies used with local, regional, or national frequency allocation are licensed television broadcasting frequencies.

15. A system of dynamic allocation of spectrum for a communication device where a band of radio frequencies is used with a local, regional, or national frequency allocation that leads to a subset of the bands containing unused or available frequencies in any geographic area, but not all channels are used in all markets due to the need to protect receivers from interference from other stations, comprising:
- a receiver for receiving an user channel map on a control channel, wherein the user channel maps contains at least boundary location information for one or more channel resources, the control channel being outside the one or more channel resources;
- a processor coupled to the receiver, wherein the processor is operable to:
- determine at least an approximate location for the communication device;
- compare the approximate location with the boundary location information;
- determine which channels can avoid co-channel and adjacent channel interference with licensed user signals and other unlicensed user signals based on the comparison; and
- relax communication parameters if no licensed user signals are found in the user channel map, tighten the communication parameters if co-channel, adjacent channel, or other interference generating channel use is found within the user channel map.

16. The system of claim 15, wherein the user channel map further comprises communication parameters comprising maximum allowable transmit power, duty cycle, and in use information by other unlicensed and licensed users.

17. The system of claim 15, wherein the processor is operable to prohibit use if a licensed operator signal is found within the user channel map.

18. The system of claim 15, wherein the boundary location information comprises polygon endpoint calculations and associated technical communication parameters.

19. The system of claim 15, wherein the processor further determines the approximate location for the communication device by using time distance of arrival or time of arrival, or other position location techniques by using a control channel signal or other signals from devices in a user channel map network.

20. A system of dynamic allocation of spectrum for a communication device where a band of radio frequencies is used with a local, regional, or national frequency allocation that leads to a subset of the bands containing unused or available frequencies in any geographic area, but not all channels are used in all markets due to the need to protect receivers from interference from other stations, comprising:
- a receiver for receiving an user channel map on a control channel, wherein the user channel maps contains at least boundary location information for one or more channel resources, the control channel being outside the one or more channel resources;
- a processor coupled to the receiver, wherein the processor is operable to:
- determine at least an approximate location for the communication device;
- compare the approximate location with the boundary location information;
- determine which channels can avoid co-channel and adjacent channel interference with licensed users and other unlicensed users based on the comparison; and
- determine how to avoid interference by determining a probability that a given user device will cause interference to a licensed user device by multiplying (P1) the probability that a given location does not have coverage on white space channel "N" times (P2) the probability that a given user device is in the proximity of a licensed receiver to cause interference.

* * * * *